United States Patent
Harpale

(10) Patent No.: US 7,222,089 B2
(45) Date of Patent: May 22, 2007

(54) INTERMEDIARY DRIVEN ELECTRONIC MARKETPLACE FOR CROSS-MARKET TRADING

(76) Inventor: Mahesh Harpale, 13 Crefeld Ct., Lincoln Park, NJ (US) 07035

( * ) Notice: Subject to any disclaimer, the term of this patent is extended or adjusted under 35 U.S.C. 154(b) by 857 days.

(21) Appl. No.: 09/950,489

(22) Filed: Sep. 11, 2001

(65) Prior Publication Data

US 2002/0032579 A1   Mar. 14, 2002

Related U.S. Application Data

(60) Provisional application No. 60/231,612, filed on Sep. 11, 2000.

(51) Int. Cl.
*G06Q 30/00* (2006.01)
(52) U.S. Cl. .................................................. 705/26
(58) Field of Classification Search ................. 705/26, 705/27
See application file for complete search history.

(56) References Cited

U.S. PATENT DOCUMENTS

| | | | |
|---|---|---|---|
| 5,873,071 A | 2/1999 | Ferstenberg | 705/37 |
| 5,890,140 A | 3/1999 | Clark | 705/35 |
| 5,970,475 A | 10/1999 | Barnes | 705/27 |
| 6,029,150 A | 2/2000 | Kravitz | 705/39 |
| 6,058,379 A | 5/2000 | Odom | 705/37 |
| 6,112,189 A | 8/2000 | Rickard | 705/37 |
| 6,260,019 B1 | 7/2001 | Courts | 705/1 |
| 6,285,989 B1 | 9/2001 | Shoham | 705/37 |
| 6,338,050 B1 * | 1/2002 | Conklin et al. | 705/80 |
| 6,434,536 B1 * | 8/2002 | Geiger | 705/37 |
| 6,493,724 B1 | 12/2002 | Cusack et al. | |
| 6,598,027 B1 * | 7/2003 | Breen et al. | 705/26 |
| 6,658,568 B1 * | 12/2003 | Ginter et al. | 713/193 |
| 2003/0014318 A1 * | 1/2003 | De La Motte et al. | 705/26 |

FOREIGN PATENT DOCUMENTS

| | | | |
|---|---|---|---|
| EP | 1096403 | * | 2/2001 |
| JP | 2002183495 | * | 6/2002 |
| WO | WO 02/069179 A2 | * | 6/2002 |

OTHER PUBLICATIONS

Lewis et al., "Third-party logistics: Leveraging information Technology", Circa 1996.*

* cited by examiner

*Primary Examiner*—Mark Fadok

(57) ABSTRACT

A method and apparatus for initiating, facilitating and carrying out cross-market electronic trading utilizing role of an intermediary in an otherwise traditional buyer-supplier transaction. The invention utilizes a publicly or privately accessible computer program that recognizes role of a participant as a buyer, a supplier, or an intermediary and specific trade restrictions in terms of operating locations, or trading markets, or selected participants in a particular electronic transaction. The invention presents method to extend the market reach of the transaction by further identifying network of participants in a role of an intermediary that can initiate and carry out electronic transaction across market boundaries and beyond selected participants to create higher liquidity in the marketplace. The invention utilizes computer program that dynamically routes the electronic transaction through identified participants anonymous or otherwise augmenting the transaction at each step with specifics for transacting parties in that step including but not limited to incentives for price markups. In one or more embodiments the invention also utilizes a computer program that matches different transaction parameters between a buy and a sell request along with intervention from participant playing role of an intermediary. The invention extends market reach of an electronic transaction across market boundaries, creates higher liquidity with higher participation and incentives, and simplifies cross-market logistics and regulations in an electronic marketplace through services of an intermediary.

10 Claims, 7 Drawing Sheets

INTERMEDIARY DRIVEN ELECTRONIC MARKETPLACE FOR CROSS-MARKET TRADING

CROSS-REFERENCE TO RELATED APPLICATIONS

This application is entitled to the benefit of Provisional Patent Application Ser. No. 60/231,612, filed 2000 Sep. 11.

BACKGROUND

1. Field of Invention

This invention relates to electronic marketplace that facilitates electronic trade, more particularly in cross-market trading.

2. Description of Prior Art

Electronic Commerce enables trade participants to initiate trade, and exchange trade related information electronically to improve the efficiency of the transaction. Electronic commerce helps in reducing latency in a transaction life-cycle and also reducing manual intervention with automated processes. Marketplaces are where participants initiate a trade and carry out a transaction provided requirements of all the parties meet. An Electronic Marketplace provides tools to facilitate electronic commerce between trade participants. There are different types of marketplaces or online exchanges depending upon type of transactions and participants e.g. one-to many, many-to-one, and many-to-many. One-to-many exchange can be Online-Procurement system wherein there is one buyer and many vendors preferred or otherwise. Many-to-one business exchange can be Online Sales system where there is one supplier and many buyers. Many-to-many exchange can be an online-product or online-service exchange where there are many buyers and many suppliers controlling the transactions by the supply-demand forces. Similarly, depending upon participants, exchange can be private or public. Private exchange involves fixed group of known participants. Public exchange involves any suitable participant with trade done anonymously or with disclosed identity.

There are several shortcomings in marketplaces that currently operating for electronic trading. A buyer or a supplier has fixed operating locations or trading markets. Many a time this market restriction is introduced by international boundaries. This causes problem for a supplier or a buyer that does not operate in those trading markets to respond to the requirement. Thus market reach of an electronic transaction becomes limited reducing the liquidity of the transaction. Also, businesses have preferred list of trade participants to reduce operational overheads. This also imposes a serious restriction on the market reach of the trade in the current electronic marketplaces.

Electronic marketplaces promise global trading crossing boundaries of traditional markets. However, cross-market trading involves complex logistics, cross-market regulations, and license restrictions that are not addressed effectively in present electronic marketplaces. For marketplaces with public trading and competitive pricing models these issues become very critical for the successful transaction. For global trading, which involves multiple international marketplaces with different regulations and logistics, costs associated with these may vary drastically and introduce operational problem for end-buyer or end-supplier to compare and make a decision based on competitive pricing.

Reduced liquidity, market restrictions, limited range of participants, and problems associated with cross-market logistics and overheads cause operational inefficiencies, higher overhead costs, and higher time to complete transaction.

Currently, there are no solutions that address the above-mentioned problems and shortcomings.

Present invention gives a method and apparatus that addresses above-mentioned problems and shortcomings. Also, it provides a completely new and unique way of creating a network of trade-participants that add tremendous value to the transaction by increasing liquidity, allowing cross-market trading taking care of cross-market logistics and regulations. Present invention when implemented increases efficiency and effectiveness and efficiency of electronic commerce. The unique process by which the information is tracked and participants interact does not compromise fixed or dynamic pricing model and private or anonymous public trading.

SUMMARY

In accordance with the present invention, intermediary driven electronic marketplace comprises a method and apparatus for initiating, facilitating and carrying out cross-market trading utilizing role of an intermediary in an otherwise traditional buyer-supplier transaction.

Objects and Advantages

Accordingly several objects and advantages of the present invention are:

(a) to provide extended market reach across traditional market boundaries, and beyond restrictions imposed by preferred list of participants;

(b) to provide high liquidity in an electronic marketplace by increased participation and extended access;

(c) to provide incentive for participants to create and maintain liquidity for said transaction;

(d) to provide competitive pricing because of increased liquidity;

(e) to provide dynamic and non-intrusive routing of trade requests, as described in the present invention, across multiple trade participants anonymously;

(f) to provide simplified logistics and cross-market regulations in an electronic marketplace through services of an intermediary; and (g) to provide intelligent matching of varied transaction parameters between a buy and a sell request with intervention from said intermediary.

DRAWING FIGURES

In the drawings, closely related figures have the same number but different alphabetic suffixes. These and other features and advantages of the invention will now be described with references to the drawings of certain preferred embodiments, which are intended to illustrate and not to limit the invention, and in which:

FIGS. 1-5 are preferred embodiments, FIGS. 6-7 are additional embodiments.

FIG. 1 is a high level architectural drawing of the primary components of a system that operates according to the present invention.

FIG. 6A illustrates registering entities, FIG. 6B illustrates process, and FIG. 6C shows flowchart for cross-market quotation function.

FIG. 7A illustrates registering entities, FIG. 7B illustrates process, and FIG. 7C shows flowchart for cross-market matching function.

REFERENCE NUMERALS IN DRAWINGS

Figure 1:
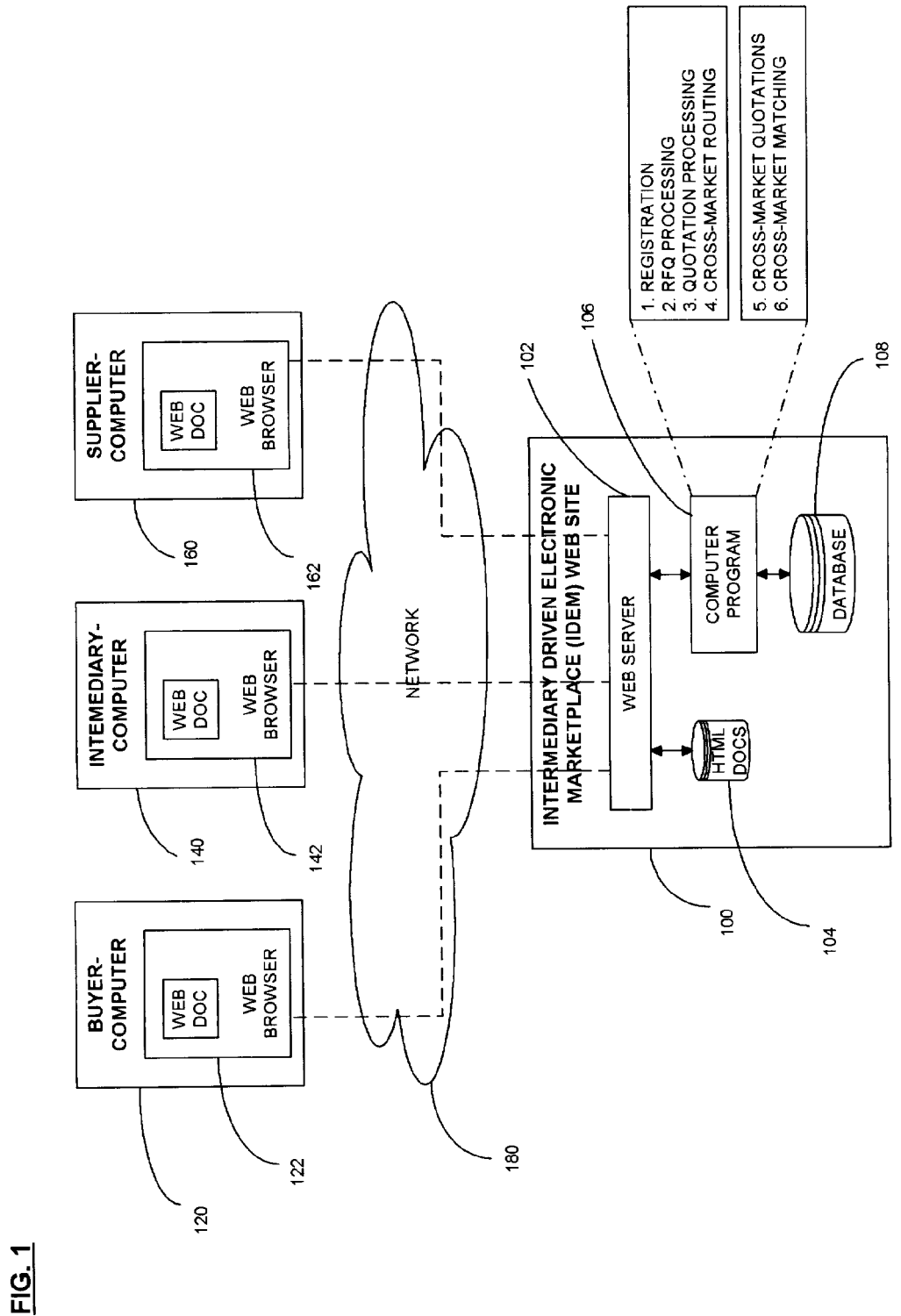

In the drawings, the first digit of each reference number indicates the Figure number in which the referenced item first appears.

100—Intermediary Driven Electronic Marketplace Web site, referred hereafter as IDEM Web site
102—Web server at IDEM Web site 100, referred hereafter as IDEM Web server
104—HTML documents at IDEM Web site 100
106—computer program for processing requests at IDEM Web site 100
108—database to store information at IDEM Web site 100
120—standard computer used by buyer, referred hereafter as buyer-computer
122—standard Web browser at buyer-computer 120, referred hereafter as buyer-browser
140—standard computer used by intermediary, referred hereafter as intermediary-computer
142—standard Web browser at intermediary-computer 140, referred hereafter as intermediary-browser
160—standard computer used by supplier, referred hereafter as supplier-computer
162—standard Web browser at supplier-computer 160, referred hereafter as supplier-browser
180—network
200—standard computer used by user who wants to trade in the marketplace. User-computer can be buyer-computer 120 or intermediary-computer 140 or supplier-computer 160
202—details of information required by IDEM Web site 100 for registration
211—buyer-computer 120 used by Buyer-B1 as illustrated in the case
221—supplier-computer 160 used by Supplier-S1 as illustrated in the case
222—supplier-computer 160 used by Supplier-S2 as illustrated in the case
223—supplier-computer 160 used by Supplier-S3 as illustrated in the case
231—intermediary-computer 140 used by Intermediary-I1 as illustrated in the case
232—intermediary-computer 140 used by Intermediary-I2 as illustrated in the case
300—details of the request for quotation (RFQ) information submitted by user
400—details of posting on IDEM Web site 100 for an RFQ
402—details of quotation submitted by bidder in response to Web site posting 400
500—details of modified quotation including mark-up by intermediaries in response to Web site posting 400
600—supplier-computer 160 used by Supplier-S4 as illustrated in the case for additional embodiment
602—intermediary-computer 140 used by Intermediary-I3 as illustrated in the case for additional embodiment
700—intermediary-computer 140 used by Intermediary-I4 as illustrated in the case for additional embodiment
702—supplier-computer 160 used by Supplier-S5 as illustrated in the case for additional embodiment
704—details of the sell request for quotation (RFQ) information submitted by supplier in the context of case for additional embodiment

DESCRIPTION OF PREFERRED EMBODIMENT

FIGS. 1-5

To facilitate a complete understanding of the invention, the description of the preferred embodiment is arranged within the following sections:
GLOSSARY OF TERMS AND ACRONYMS
COMPONENT DESCRIPTION AND OPERATION
ADDITIONAL EMBODIMENTS
ADVANTAGES Glossary of Terms and Acronyms:

The following terms and acronyms are used throughout the description:

Client-Server: A model of interaction in a distributed system in which one program sends a data-processing request to another independent program. The requesting program is called the "client", and the program that responds to the request is called the "server".

Internet: A collection of interconnected (public or private) networks that are linked together by a set of standard protocols. Internet allows two computers on two disparate networks to connect and send requests to each other.

Intranet: Intranet is a sub-type of Internet where internal networks are connected together and only internal people from the organizations have access. Outside people can not access Intranet.

Extranet: Intranet is a sub-type of Internet where internal networks are connected together with a link to the outside trusted networks and internal people from the organizations as well as alliance partners have access. General public can not access Intranet.

World Wide Web ("Web"): A distributed collection of inter-linked, user-viewable hypertext documents (commonly referred as Web documents or Web pages) that are accessible via the Internet. It is also used herein to refer to the client and server software components, which provide user-access to such documents using standardized Internet protocols.

Web Site: A computer system that serves informational content over a network using the standard protocols of World Wide Web. Typically, a Web site corresponds to a particular Internet domain name, such as "networksolutions.com". As used herein, the term is generally intended to encompass the hardware/software server components that server the informational content over the network Web Server: Web server is a software component of a Web site that accepts HTTP requests and serves informational content with the help of static HTML documents or other software components helping to create dynamic HTML documents or combination of both.

Web Browser: Web browser is a software component at the client side that accesses the informational content from Web server. Broadly, Web browser accesses informational content and renders it on the client screen.

HTTP (Hyper Text Transport Protocol): The standard World Wide Web client-server protocol used for the exchange of information. HTTP includes a number of different types of messages that can be sent from the client to the server to request different types of server actions. HTTP GET request sends a message to server to access a document. HTTP POST request sends a message to server to process data and includes data in the message.

HTML (Hyper Text Markup Language): A standard coding convention and fixed set of codes for attaching presentation and linking attributes to informational content within documents.

CGI ("Common Gateway Interface"): A standard for running external programs at Web server that typically generates a dynamic response to the browser's request.

Web Server Plug-in ("Plug-in"): Standard extension to the Web server that allows a request to be served dynamically by executing a set of server side instructions.

Application Server: Computer application that accepts requests from the user, accumulates data from various server side applications, formats it suitable for the user interface, and sends the data back to end-user. In web application scenario, application server works in conjunction with web server and accepts request, and provides the formatted data to web server.

Electronic Marketplace ("Marketplace"): A web site allowing users to buy or sell commodities or services electronically using Internet and World Wide Web. Buyer and seller interact using the Web documents on the Web site for electronic marketplace. Online marketplace allows electronic commerce.

Public marketplace: A marketplace open for trading to public.

Private marketplace: A marketplace open for trading to only people internal to organization and its partner organizations.

Marketplace-user ("User"): As used herein, a user who registers to trade commodities or services in a marketplace.

End-buyer: Buyer, who finally consumes the goods to be traded $1^{st}$ tier supplier: Producers or original distributors of the goods.

Intermediary ("$2^{nd}$ tier supplier"): An entity that does not actually produce or consume the goods but facilitates the trade between end-buyer that consumes the goods and producer of the goods. Intermediary adds value to the end-to-end transaction by providing cross-market information, liquidity of the goods, and logistics.

Trading market: As used herein, business entities with whom user can do trading.

Cross-trading: As used herein, trading to buy from a supplier and sell to a buyer maintaining liquidity of the goods across trading markets.

Request for quotation (RFQ): Formal request form distributed by user to procure or sell goods. Using RFQ user requests counter-party to submit a formal quotation.

Component Description and Operation:

FIG. 1 illustrates a general architectural drawing of the primary components of a system that operates according to the present invention. The system includes an IDEM Web site 100, a buyer-computer 120, an intermediary-computer 140, and a supplier-computer 160 all linked together by the network 180. Invention can be used to create both public marketplace as well as private marketplaces. For public marketplaces network will be Internet. For private marketplaces network will be an Intranet or an Extranet.

IDEM Web site 100 is a server including IDEM Web server 102, HTML documents 104 for user interface, computer program 106 for data processing, and a database 108 for data storage. Buyers, intermediaries, and suppliers use buyer-computer 120, intermediary-computer 140, and supplier-computer 160 respectively to interact with IDEM Web site 100. To request any information from IDEM Web site 100 users send an HTTP GET request to IDEM Web server 102, while to submit any information users send HTTP POST request to IDEM Web server 102. IDEM Web Server 102 is an HTTP server that accepts a user request and generates a response to be sent back to the user. It can generate the response using HTML documents 104 and/or using a computer program 106. HTML documents 104 provide the static information content while computer program 106 does data processing and provides dynamic information content. Computer program 106 is either a CGI application or a Web server plug-in or an application server. Buyer-computer 120, intermediary-computer 140, and supplier computer 160 may be any type of computing device that allows a user to access network using a Web browser. Buyer-computer 120 includes buyer-browser 122 for Web browsing; intermediary-computer 140 includes intermediary-browser 142 for Web browsing; and supplier-computer 160 includes supplier-browser 162 for Web browsing. The browser can be any type of standard Web browser.

IDEM web site 100 is an electronic marketplace that provides functionality for allowing customers to procure or sell commodities online. It allows transaction between end-buyers and $1^{st}$ tier suppliers. End-buyers are the final consumers of goods. $1^{st}$ tier suppliers are the producers or original distributors of the goods. End-buyer uses buyer-computer 120 to connect with IDEM Web site 100 and controls the buy part of trade. Supplier uses supplier-computer 160 to connect with IDEM Web site 100 and controls sell part of trade. Intermediary facilitates end-to-end transaction by providing cross-market contacts and information, liquidity of goods, and value-added services like logistics & distribution. Intermediary uses intermediary-computer 140 to connect with IDEM Web site. Intermediary controls cross-market routing part of trade that includes both buying goods and selling goods.

Figure 2A:
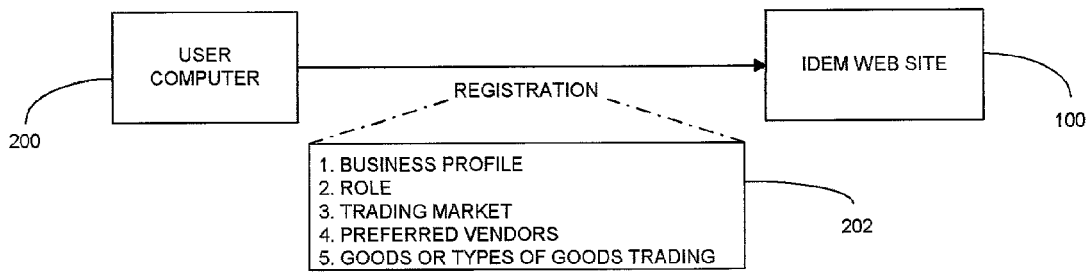
FIG. 2A is a drawing of the process illustrating customer registration function.
Figure 2B:
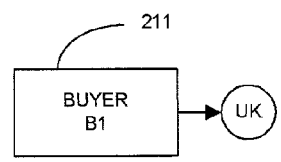
FIGS. 2B-2D illustrate various entities, and respective trading markets considered in a case to explain operation of the invention.
Figure 2C:
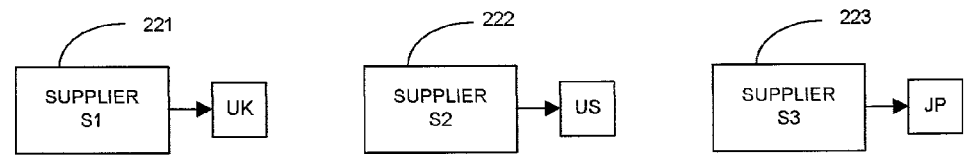
Figure 2D:
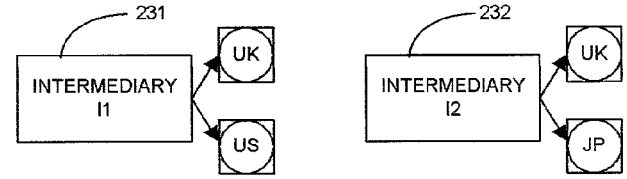
Figure 3A:
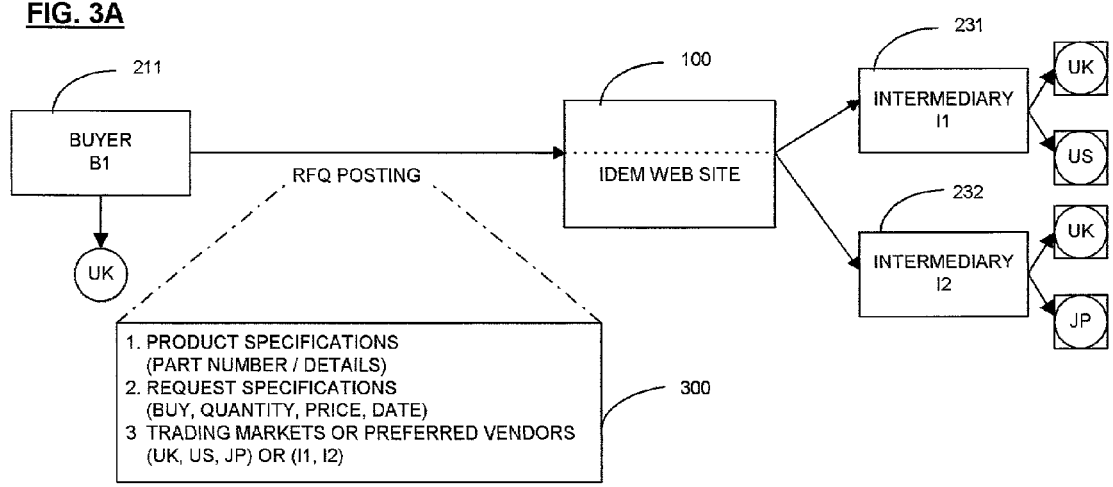
FIG. 3A illustrates process for a request for quotation (RFQ) processing function.
Figure 3B:
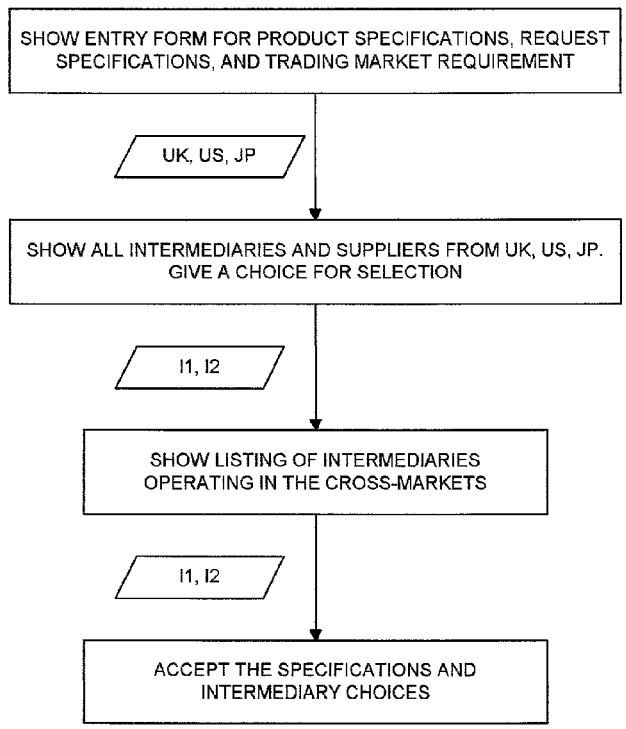
FIG. 3B is flowchart for RFQ function.
Figure 4A:
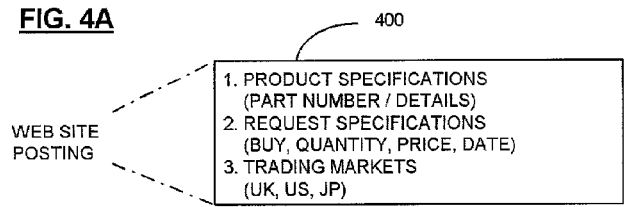
FIG. 4A shows details of a posting in the marketplace.
Figure 4B:
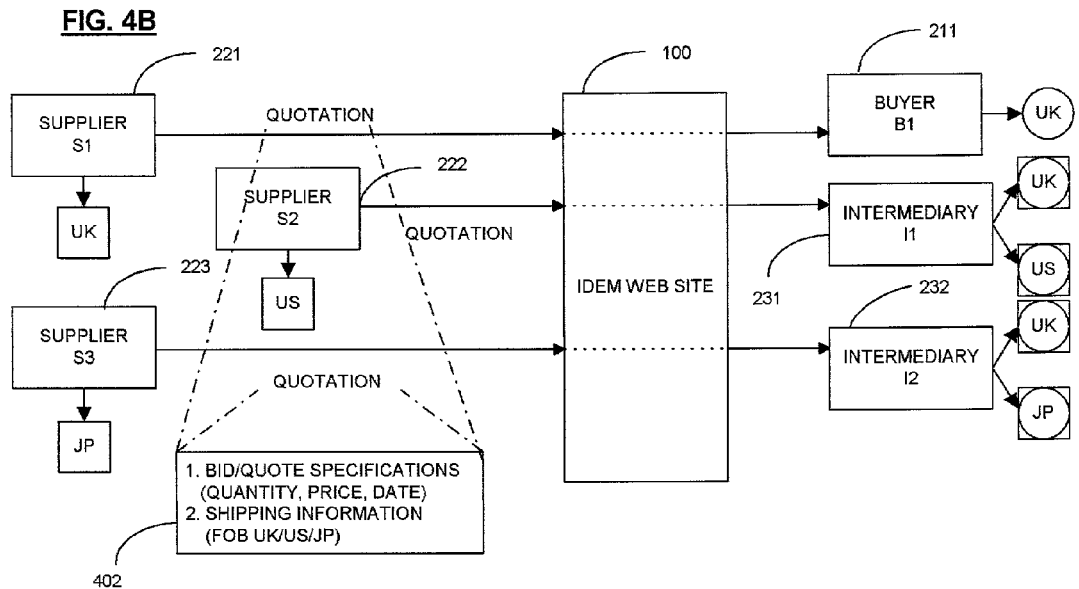
FIG. 4B illustrates process and FIG. 4C shows flowchart for quotation processing function.
Figure 4C:
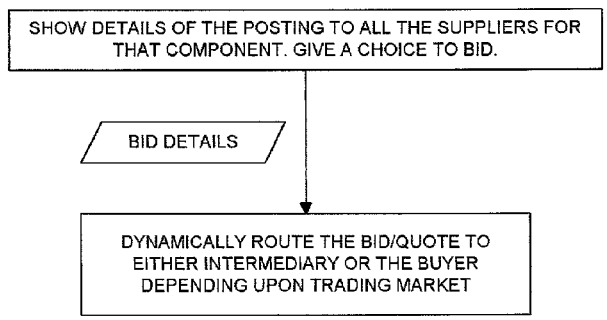
Figure 5A:
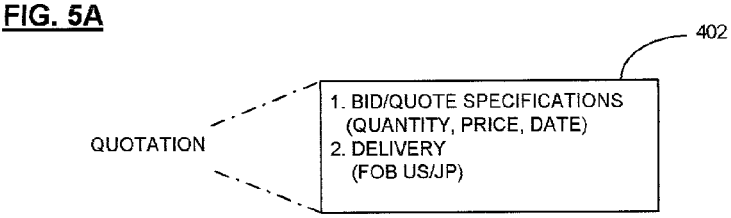
FIG. 5A shows details of a quotation or a bid posting in the marketplace.
Figure 5B:
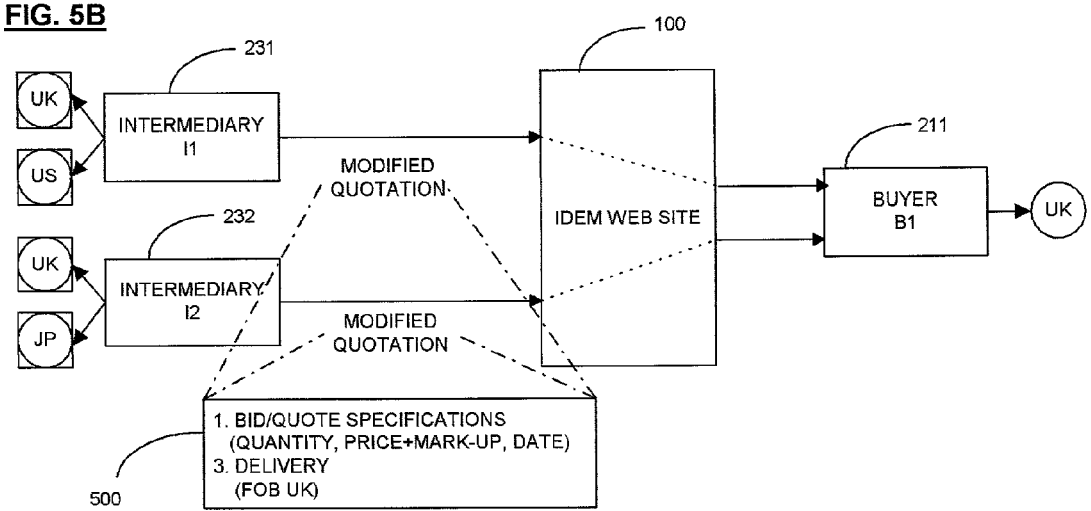
FIG. 5B illustrates process and FIG. 5C shows flowchart for cross-market routing function.
Figure 5C:
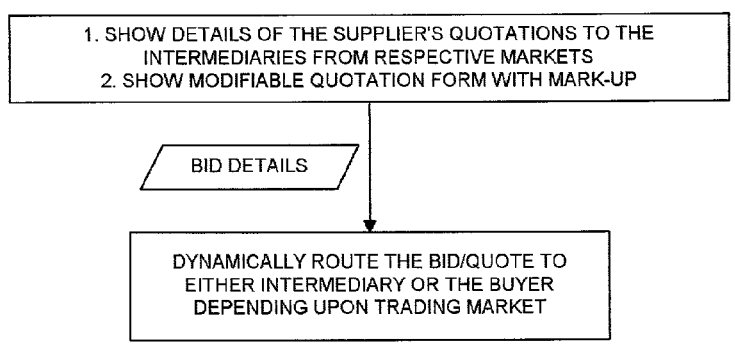
Figure 6A:
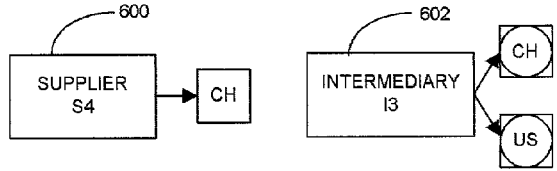
FIGS. 6A-6C illustrate an additional embodiment for cross-market quotation function by a supplier.
Figure 6B:
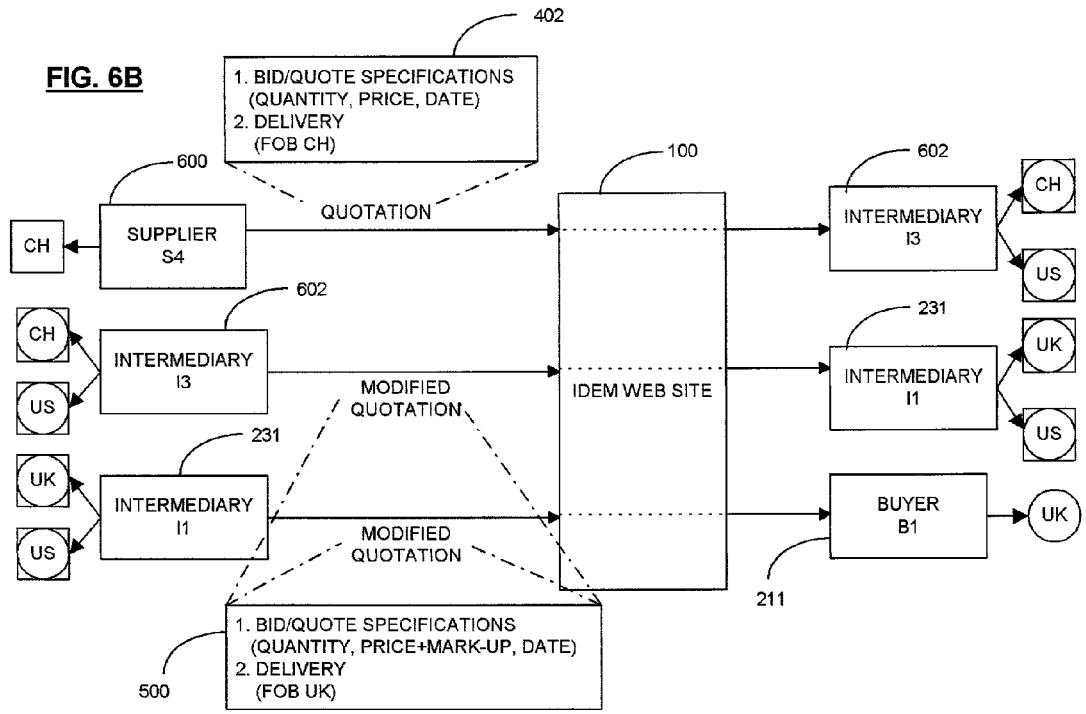
Figure 6C:
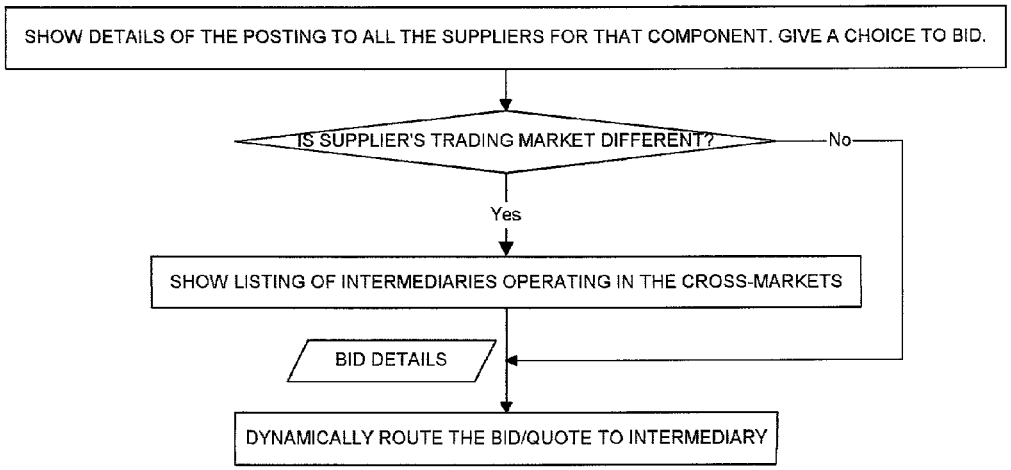
Figure 7A:
FIGS. 7A-7C illustrate an additional embodiment for cross-market matching function by an intermediary.
Figure 7B:
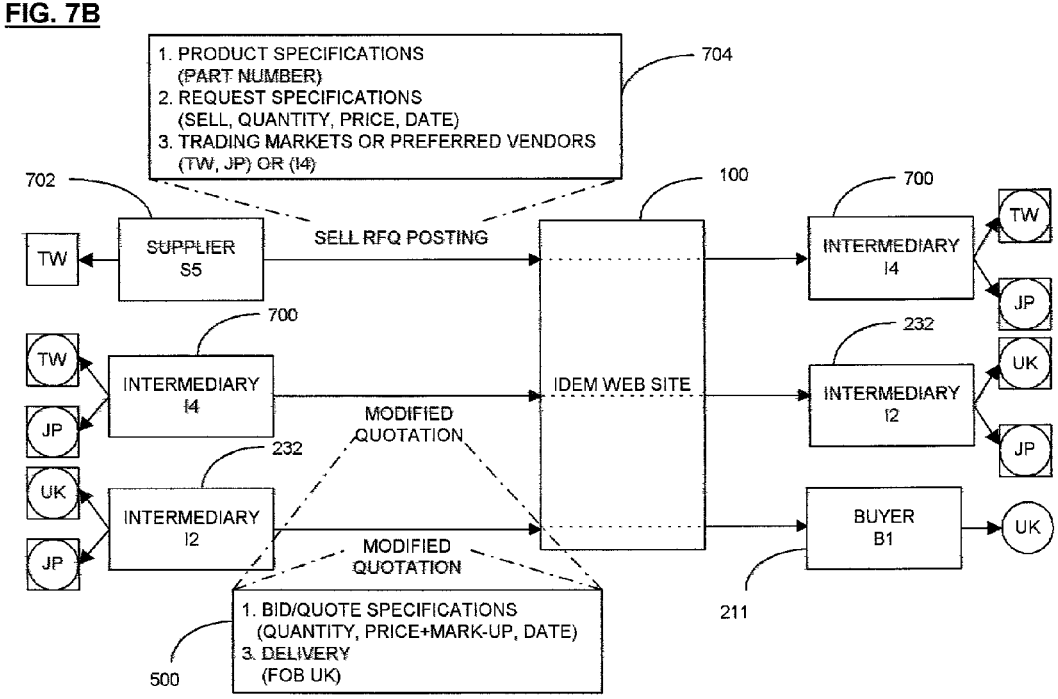
Figure 7C:
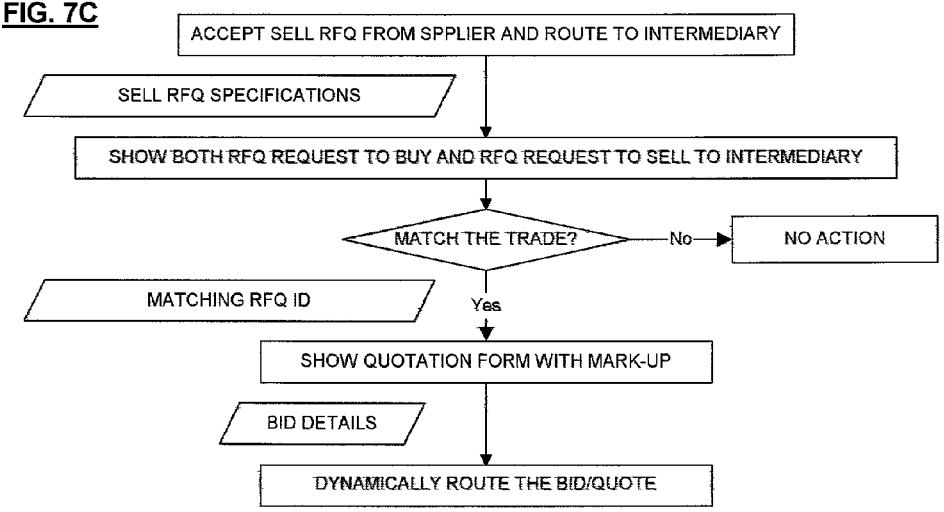

Computer program 106 used by IDEM Web site 100 performs four functions in context of the present invention: registration, request for quote (RFQ) processing, quotation processing, cross-market routing; it also provides two functions as additional embodiment to the present invention: cross-market quotations, cross-market matching. Registration function enrolls various business entities that want to trade in the marketplace and creates their trading profiles. Registration function is illustrated in FIGS. 2A-2D. RFQ processing function accepts request for quotation and market information from potential buyer or supplier and processes it for posting and dynamic workflow. RFQ processing function is illustrated in FIGS. 3A-3B. Quotation processing function accepts bids on the RFQ postings from potential supplier or buyer and processes it for bid posting or dynamic workflow through intermediaries. Quotation processing function is illustrated in FIGS. 4A-4C. Cross-market routing function provides the workflow for matching the trading market criteria between end-buyers and suppliers through intermediaries. Cross-market routing function is illustrated in FIGS. 5A-5C. Cross-market quotation function provides functionality to enable a bidder submit bid across markets using intermediaries. Cross-market quotation function is illustrated in FIGS. 6A-6C. Cross-market matching function provides functionality for an intermediary to match two complementary RFQ postings i.e. a buy RFQ posting and a sell RFQ posting with identical part specifications. Cross-market matching function is illustrated in FIGS. 7A-7C.

FIGS. 2A-2D illustrate registration function of IDEM Web site 100. A user that wants to trade in the marketplace needs to register with IDEM Web site 100. A user can be a buyer, or a supplier, or an intermediary. On the request from user-computer 200, IDEM Web server 102 sends user registration HTML page. User fills out required registration data 202 and posts the HTTP request back to IDEM Web server 102. Computer program 106 at IDEM Web site 100 processes registration data and stores it in database 108. Processing includes validating the data for correctness of format and information. Registration data 202 includes business profile of the user and the business entity that s/he represents, role played by the user whether buyer, supplier or intermediary, trading markets in which the user transacts, optionally, preferred vendors used by the user for trading, and goods or types of goods trading. Trading market signifies the business entities with whom user can do trading. Trading markets are restricted by physical locations or by business preference. Trading market restricted by physical locations signifies the physical location where a business can legally supply the goods. Trading market restricted by business preference signifies trading restrictions used by the business as a way of standardizing or followed procedures. User can specify trading markets by location and/or by listing preferred vendors. Preferred vendors are the complementary registered trading partners used by user.

To explain the operation of the invention, a case is described. In the case, there are three types of entities using IDEM Web site 100, buyers, suppliers, and intermediaries. Buyer-B1 211 is registered with IDEM Web site 100 with its business profile, role as a buyer for all electronic components, and trading market as all the business entities from United Kingdom (UK). As explained above, a buyer can specify trading market specifying location and/or listing business entities specifically as preferred vendors. However, in the current case trading market is being specified by location, which means that all the business entities from that particular location. Supplier-S1 221, Supplier-S2 222, and Supplier-S3 223 are all registered with their business profile, role as supplier for all electronic components, and trading market as all business entities from UK, United States (US), and Japan (JP) respectively. Intermediaries trade to buy from a supplier and sell to a buyer maintaining liquidity of the goods across markets. Trading across markets is referred hereafter as "cross-trading". Intermediary-I1 231, and Intermediary-I2 232 are registered with their business profile, role as intermediary to both buy & sell all electronic components. Intermediary-I1 231 is registered to cross-trade in trading markets for UK and US, while Intermediary-I2 232 is registered to cross-trade in trading markets for UK and JP. In FIG. 2B-2D circle indicates trading to buy in the market, a square indicates trading to sell, and a square with circle indicates trading to sell as well as buy.

FIGS. 3A-3B illustrate RFQ processing function of IDEM Web site 100. RFQ processing function allows user to post a buy or a sell request for quotation. The case illustrates a buy request from buyer. Sell request from supplier operates in the same way except that the request specifications are altered for selling the goods. Optionally, Intermediary can also post a request to buy/sell of the stored goods or on behalf of a buyer/supplier. RFQ posting 300 gives details of data required for posting a request. RFQ posting 300 requires following information from user: 1. Product to be traded specified using inventory part number and/or product specifications, 2. Information about request including type of request whether sell or buy, quantity, asking or selling price, date up to which request is valid, and optionally tentative date of procurement or sell. 3. Trading markets specified as business entities from a particular location or specific listing. For example, Buyer-B1 211 posts request with IDEM Web site 100 for an electronic component specifying part number as AMD 6086 and details of the component to buy 1000 items at $500 per item with request validity up to Jun. 30, 2000. Buyer-B1 specifies to select from vendors from UK, JP, and US and select I1, and I2 as preferred vendors for the request. Optionally Buyer-B1 211 can specify all vendors from UK, US, JP. Buyer-B1 211 can also choose from private or public posting. In private posting, request is issued only to vendors specified while in public posting request can also be seen by other users. Buyer-B1 211 offers a public posting. IDEM Web site 100 processes the request and routs it to Intermediary-I1 231 and Intermediary-I2 232 for cross-market bidding. It also posts request on site for public bidding.

FIG. 3B illustrates flowchart for RFQ processing function. Primary steps are as follows: 1. IDEM Web site 100 shows entry for posting a request. 2. Buyer-B1 211 fills out and submits form with posting details, choosing to select vendors from US, UK, JP. 3. IDEM Web site 100 shows listing of all intermediaries & suppliers from selected locations. 4. Buyer-B1 211 selects I1, I2. 5. Request data is processed, routed to specified vendors, I1, and I2, and posted on site for user viewing purpose.

FIG. 4A shows details of the request posted on IDEM Web site 100 as a Web Site posting 400. Web site posting 400 gives following details: 1. Part number and/or product specifications. 2. Request specification including request type whether request is to buy or to sell, quantity of items requested, price, and validity date. 3. Locations where the product will be accepted/traded. FIGS. 4B-4C illustrate quotation processing function of IDEM Web site 100. Users can bid on postings. Users can be buyers, suppliers, or intermediaries depending upon type of trade requested in the posting. Posting indicates location/market where product will be traded. Only users with profiles of trading in those markets will be allowed to bid. If a user does not have legal authority to trade in a particular market specified in bid, s/he can still use an intermediary trading in those cross-markets to bid on that posting. As illustrated in FIG. 4B, Supplier-S1 221, Supplier-S2 222, and Supplier-S3 223 trade in electronic components category for trading market in UK, US, JP and submit a bid for Web site posting 400. Bid has quotation 402 information giving following details: 1. Price quote for available quantity of the item to be traded, date up to which item can be delivered, and optionally, date up to which items can be available at the specified price. 2. Shipping information and charges, if any. IDEM Web site 100 receives bids and processes them for dynamic routing to respective recipients depending upon request, bid, and trading market specifications. So as illustrated in FIG. 4B for the current case bid from Supplier-S1 221 trading in UK is routed directly to Buyer-B1 211 also trading in UK, bid from Supplier-S2 222 trading in US is routed to Intermediary-I1 231 trading in cross-markets US & UK, and bid from Supplier-S3 223 trading in JP is routed to Intermediary-I2 232 trading in cross-markets JP & UK.

FIG. 4C illustrates flowchart for quotation processing function. Primary steps are as follows: 1. IDEM Web site 100 show details of Web site posting 400 to specified vendors in private area of Web site and also to all users in public area of Web site under product category since request specifies public posting. 2. Users are given choice to bid on the request. 3. Bid from users are accepted and routed dynamically to user posting the request or to specified intermediaries depending upon matching trading markets.

FIG. 5A shows quotation 402 that is routed dynamically by IDEM Web site 100 to respective intermediaries as explained in quotation processing function above. FIG. 5B illustrates this cross-market routing function of IDEM Web site 100. Intermediaries maintain the liquidity of the goods in marketplace by moving the goods across trading markets. Intermediaries can see bids submitted by suppliers or other intermediaries for a posting. Intermediaries can choose one or more bids that are placed with them and submit one or more final bid to user who has originally posted the request. As illustrated in FIG. 5B, Intermediary-I1 231 and Intermediary-I2 232 receive bids from Supplier-S1 221 and Supplier-S2 respectively. Intermediaries mark-up bid price before bidding across markets to poster to make up for moving the goods across markets. Intermediary-I1 231 and Intermediary-I2 232 add mark-up price, adjust bid quotation, and forward modified quotation 500 to Buyer-B1 211 for review. Buyer-B1 211 receives final bids from Supplier-S1 221, Intermediary-I1 231, and Intermediary-I2 232. Buyer-B1 211 does not know about and trade with Supplier-S2 222 and Supplier S3 223. Similarly, Supplier-S2 222, and Supplier S3 223 come across and trade only with Intermediary-I1 231 and Intermediary-I2 respectively. So, market knowledge of intermediaries is not disclosed by the marketplace as described in the invention without obstructing flow of the trade.

FIG. 5C illustrates flowchart for cross-market routing function. Primary steps are as follows: 1. IDEM Web site 100 show details of quotation 402 by $1^{st}$ tier bidders to respective intermediaries in private area of the Web site. 2. Intermediaries are given choice to mark-up and/or modify bid details for quotation. 3. Changed quotation is accepted from intermediaries and routed dynamically to user posting the request.

Negotiations for price and actual order processing of the goods are conducted through the same workflow. Buyer places the order with intermediary who in-turn places the order with supplier. However, depending upon the shipping information that intermediaries have, they can direct shipping from $1^{st}$ tier suppliers directly to end-buyers to avoid double shipping charges.

The case as described above illustrates a buy request from buyer fulfilled by a bid from supplier and modified cross-market bid from intermediary. Similarly, supplier can post a bid to sell in the same way with request specifications altered for selling the goods. Then, sell request is posted on IDEM Web site 100 and buyer bids on the request with intermediary offering cross-market buy quotation to supplier. The process map remains the same with specifications altered for sell instead of buy.

Additional Embodiments

FIGS. 6A-6C, 7A-7C

FIGS. 6A-6C illustrate additional embodiment for cross-market quotation function of IDEM Web site 100. This embodiment also shows benefits offered by public posting. As explained above, public posting is Web site posting 400 of the request in public area where all users can see the details and bid on it by submitting a quotation. Web posting 400 as illustrated in FIG. 4A includes following details: 1. Part number and/or product specifications. 2. Request specification including request type whether request is to buy or to sell, quantity of items requested, price, and validity date. 3. Locations where the product will be accepted/traded. User who trades for the listed component can apply bid only if s/he trades in one of the markets specified in the posting. If not, user can still bid for the posting by using an intermediary that trades in the cross-markets. FIG. 6A illustrates case of a supplier, Supplier-S4 600 registered to supply goods in trading market of China (CH), and an intermediary Intermediary-I3 602 registered to trade in cross-markets of CH & US. FIG. 6B illustrates process of cross-market quotation by supplier-S4 600 on the posting by Buyer-B1 211. Since Buyer-B1 211 has specified posting as a public posting, Supplier-S4 600 can view details of the posting by Buyer-B1 211 in public area of the site even when he is not listed in vendor listing by Buyer-B1 211. Since, Supplier-S4 600 does not trade in trading markets specified in request i.e. US, UK, and JP s/he will have to use an intermediary trading in cross-markets to bid on the posting. Supplier-S4 600 selects Intermediary-I3 602. This enables Supplier-S4 600 to bid with cross-market quotation 402. IDEM Web site routes the bid dynamically to Intermediary-I3 602, who modifies the quotation for mark-ups and submits modified quotation 500 for trading in US market. Since, Intermediary-I1 231 is trading for the Web Site posting 400 in US market, IDEM Web site 100 routes the bid dynamically to Intermediary-I1 231, who modifies the quotation for mark-up and submits modified quotation 500. IDEM Web site 100 routes the modified quotation 500 to Buyer-B1 211.

FIG. 6C illustrates flowchart for cross-market quotation function. Primary steps are as follows: 1. IDEM Web site 100 show details of Web site posting 400 to all users in public area of the Web site. 2. Users are given choice to submit a bid. 3. Bid details are validated and trading markets of user is checked for a match with trading markets specified in Web site posting 400 4. If user bidding is not in trading market specified in Web site posting 400, user is shown a listing of intermediaries trading in cross-markets and user is asked to choose 5. Quotation and intermediary selection is accepted and quotation is routed dynamically to selected intermediary. 6. Workflow followed for cross-market routing is similar to workflow illustrated in FIG. 5C.

FIGS. 7A-7C illustrate additional embodiment for cross-market matching function of IDEM Web site 100. FIG. 7A illustrates case of an intermediary, Intermediary-I4 700, registered to trade in cross-markets of Taiwan (TW) & JP and a supplier, Supplier-S5 702, registered to supply goods in trading market of TW. FIG. 7B illustrates process of cross-market matching by Intermediary-I4 700 on the posting by Buyer-B1 211. Since Buyer-B1 211 has specified posting as a public posting, Intermediary-I4 700 can view details of the Web site posting 400 in public area of the site. Supplier-S5 702 trading in TW has already submitted a sell RFQ posting 704 with Intermediary-I4 700 trading in cross-markets of TW & JP as vendor. IDEM Web site 100 then routs dynamically sell RFQ posting 704 to private area of Intermediary-I4 700. As explained above Intermediary-I4 700 can view both the postings i.e. Web site posting 400 submitted by Buyer-B1 211 and sell RFQ posting 704 submitted by Supplier-S5 702. If the product specifications of these postings are same & request specifications complementary, then Intermediary-I4 700 can match the two requests by modifying sell RFQ posting 704 with mark-ups and submitting modified quotation 500 to IDEM Web site 100. As illustrated in FIG. 7B, since, Intermediary-I4 700 is trading in JP market, IDEM Web site 100 routes the bid dynamically to Intermediary-I2 232, who further modifies the quotation for mark-up and submits modified quotation 500. IDEM Web site 100 routes the modified quotation 500 to Buyer-B1 211.

FIG. 7C illustrates flowchart for cross-market matching function. Primary steps are as follows: 1. IDEM Web site 100 shows details of Web site posting 400 to all users in public area of the Web site. 2. IDEM Web site 100 shows details of sell RFQ posting 704 from Supplier-S5 702 to Intermediary-I4 700 in private area of the Web site 3. Intermediary-I4 700 is given choice to match the sell RFQ posting 704 against Web site posting 400 if product specifications are same and request specifications are complementary. 4. Bid details are validated and trading markets of bidder is checked as explained previously 6. Quotation is accepted and routed dynamically to either intermediary or buyer depending upon trading market parameters. 7. Workflow followed for cross-market routing is similar to workflow illustrated in FIG. 5C.

Advantages

From the description above, a number of advantages of the present invention become evident:

(a) The present invention presents highly efficient and effective way of creating & maintaining liquidity of commodity type of goods using an intermediary driven marketplace for cross-market trading in the way as has been described. Contemporary electronic marketplaces focus on buyers & suppliers of the goods. However, in a trade between end-buyer & 1$^{st}$ tier supplier of the goods there are many limiting factors like preset business procedures, vendor affinity, international trade boundaries, logistics, and distribution. Introduction of intermediaries to electronic marketplaces in the way that has been done in the present invention adds a tremendous value in overcoming these limiting factors. These intermediaries by using cross-market trading, as has been explained in description, not only overcome obstacles in final trade but also add to actually promoting the trade using the market information that they have.

(b) As explained in the description above the unique way IDEM handles dynamic routing of the trade requests, market information of intermediaries is not compromised for effectiveness of the trade. This allows intermediaries to gain revenue by putting mark-ups on the trade on the virtue of their market information and market access. This innovative way of using intermediaries in an electronic marketplace as has been described in the present invention gives the intermediaries an incentive to promote the electronic trading in the marketplace.

(c) For end-buyers, 1$^{st}$ tier suppliers, as well as for intermediaries, the present invention offers a way to expand market reach virtually to any length by using collaboration. This offers a tremendous ability for the marketplace to maintain liquidity of the commodity goods.

(d) Matching of electronically submitted trade requests has been a major problem in contemporary marketplaces. The invention described presents a completely new way of handling the trade electronically with matching initiated by intermediaries. This offers a simple yet powerful solution to the long-standing problem.

(e) The present invention allows all the complex logic of dynamically routing the trade request & trade bids to be modularized in six primary processes and stored in IDEM Web site. This offers an incredibly simplistic view to the users of electronic marketplace with all the complex logic of intermediaries and cross-market routing handled by IDEM Web site.

Conclusions, Ramifications, and Scope

Although the description above contains many specifications, these should not be construed as limiting the scope of the invention but as merely providing illustrations of some of the presently preferred embodiments of this invention. The scope of the invention should be determined by the appended claims and their legal equivalents, rather than by the examples given.

I claim:

1. A method for facilitating an electronic transaction across a plurality of trade participants through a central controller, the central controller performing the steps of:

registering a plurality of traders and recording for each an identification of business entity, a business profile and a plurality of business preferences to engage in a trade;

registering a plurality of traders in a role of an intermediary who act transparently in a capacity of a buyer or a seller to facilitate the trade across a plurality of markets, and recording for each an identification of business entity, a business profile and a plurality of business preferences to engage in the trade;

identifying for said registered traders a trading market comprised of a plurality of business entities with whom said traders do trading based on trading restrictions of said business preferences;

receiving a trading proposal from an initiating one of the traders and recording for said proposal a trade specification comprised of a product specification, and a plurality of trading preferences;

identifying a plurality of trading markets based on said trading proposal and said business preferences of initiating one of the traders by choosing selected ones of said traders having trading preferences compatible with the initiating one of the traders;

developing a plurality of trading markets by choosing additionally correlated ones of said traders in the role of intermediary having trading preferences compatible with said proposal of the initiating one or the selected ones of said traders, the trading markets being interconnected by at least two intermediaries in order to form a network of interconnected markets having an increased scope in comparison to individual ones of the trading markets;

presenting information about the trading proposal dynamically to said traders selected for compatibility with the trading preferences compatible with the initiating one and the selected ones of said traders in a plurality of said identification steps before acceptance of a finalized transaction based on the trading proposal of the initiating one of the traders; and receiving an acceptance or a counter-trading proposal from selected ones of said traders by means of recording dynamic routing information based on the plurality of said identification and information presentation steps;

permitting the traders in the role of an intermediary from the interconnected markets to anonymously collect compensation on the products based at least in part on one or more quotes circulating between the initiating one of the traders and another one of the traders.

2. A method according to claim 1 wherein an initiating plurality of the traders each specifies a willingness to trade with a corresponding one or more of the traders, the initiating plurality of traders having corresponding trading markets that do not necessarily overlap.

3. A method according to claim 1 wherein the step of receiving a trading proposal includes a preference to receive a plurality of trading proposals from any participating trader, the step of presenting information is performed by transmitting information about trading proposals to all the trade participants including ones with non-overlapping trading markets, and the step of receiving an acceptance or a counter trading proposal is not restricted to the selected ones of said traders.

4. A method according to claim 3 comprising the step of:
receiving from one of the plurality of traders in the role of an intermediary, an offer to facilitate a trade between two of the participating plurality of traders.

5. A method according to claim 4 wherein the step of receiving an offer to facilitate a trade is performed by identifying a plurality of traders having said trading markets compatible with the ones of said trader in the role of an intermediary and the ones of said trading proposal to fulfill one or more of said trade specifications, and comprising the steps of:
transmitting information about one or more of said trade specifications to said receiving plurality of the traders; and
receiving a counter trading proposal from said receiving plurality of the traders, each of the traders of the receiving plurality that send trading proposals being added to a counter proposal by said trader in the role of an intermediary.

6. A method according to claim 1 wherein the step of registering traders comprises recording for each a geographical scope of trading, type of goods traded, and business preferences.

7. A method according to claim 1 wherein the trading proposal from the initiating one of the traders can specify one or more of: quantity, price, geographical scope, expiration date, and closing date.

8. A method according to claim 1 wherein the step of using at least one of the intermediaries to facilitate execution is performed to accomplish a trade across a national boundary.

9. A method according to claim 8 wherein the step of using at least one of the intermediaries to facilitate execution is performed to fulfill licensing requirements and import-export regulations.

10. A central controller for facilitating an electronic transaction across a plurality of trade participants, the central controller comprising:
a central processor accessible over a network by a plurality of traders and a plurality of intermediaries, said processor being operable to:

(a) register a plurality of traders and recording for each an indentification of business entity, a business profile and a plurality of business preferences to engage in a trade;

(b) register a plurality of traders in a role of an intermediary who act transparently in a capacity of a buyer or a seller to facilitate the trade across a plurality of markets, and recording for each an identification of business entity, a business profile and a plurality of business preferences to engage in a trade;

(c) identify for said registered traders a trading market comprised of a plurality of business entities with whom said traders do trading based on trading restrictions of said business preferences;

(d) receive a trading proposal from an initiating one of the traders and recording for said proposal a trade specification comprised of a product specification, and a plurality of trading preferences;

(e) identify a trading market based on said trading proposal and said business preferences of initiating one of the traders by choosing selected ones of said traders having trading preferences compatible with the initiating one of the traders;

(f) developing a plurality of trading markets by choosing additionally correlated ones of said traders in the role of intermediary having trading preferences compatible with said proposal of the initiating one or the selected ones of said traders, the trading markets being interconnected by at least two intermediaries in order to form a network of interconnected markets having an increased scope in comparison to individual ones of the trading markets;

(g) present information about the trading proposal dynamically to said traders selected for compatibility with the trading preferences compatible with the initiating one and the selected ones of said traders in a plurality of said identification steps before acceptance of a finalized transaction based on the trading proposal of the initiating one of the traders; and (h) receive an acceptance or a counter-trading proposal from selected ones of said traders by the means of recording and routing information dynamically based on plurality of said identification and information presentation steps;

(i) permit the traders in the role of an intermediary from the interconnected markets to anonymously collect compensation on the products based at least in part on one or more quotes circulating between the initiating one of the traders and another one of the traders.

* * * * *